United States Patent
Pang et al.

(10) Patent No.: US 11,075,720 B2
(45) Date of Patent: Jul. 27, 2021

(54) COMMUNICATIONS NETWORK FOR COMMUNICATION BETWEEN A CONTROL UNIT AND A POWER ELECTRONICS ELEMENT

(71) Applicant: ABB Power Grids Switzerland AG, Baden (CH)

(72) Inventors: Zhibo Pang, Västerås (SE); Dacfey Dzung, Wettingen (CH); Mikael Davidsson, Västerås (SE)

(73) Assignee: ABB POWER GRIDS SWITZERLAND AG, Baden (CH)

( * ) Notice: Subject to any disclaimer, the term of this patent is extended or adjusted under 35 U.S.C. 154(b) by 0 days.

(21) Appl. No.: 16/614,257

(22) PCT Filed: May 16, 2017

(86) PCT No.: PCT/EP2017/061771
§ 371 (c)(1),
(2) Date: Nov. 15, 2019

(87) PCT Pub. No.: WO2018/210413
PCT Pub. Date: Nov. 22, 2018

(65) Prior Publication Data
US 2020/0076548 A1  Mar. 5, 2020

(51) Int. Cl.
*H02J 3/36* (2006.01)
*H04L 1/20* (2006.01)
*H04L 1/16* (2006.01)

(52) U.S. Cl.
CPC .............. *H04L 1/20* (2013.01); *H02J 3/36* (2013.01); *H04L 1/16* (2013.01)

(58) Field of Classification Search
CPC ..... H02J 3/36; H04L 1/16; H04L 1/18; H04L 1/20; H04L 2001/0093; H04L 2001/0097
See application file for complete search history.

(56) References Cited

U.S. PATENT DOCUMENTS

2006/0138113 A1   6/2006  Ott
2007/0275656 A1*  11/2007  Chang .................. H04L 1/08
                                                                    455/9
(Continued)

FOREIGN PATENT DOCUMENTS

CN          101069378 A      11/2007
CN          101573907 A      11/2009
(Continued)

OTHER PUBLICATIONS

International Preliminary Report on Patentability, issued in PCT/EP2017/061771, dated Apr. 10, 2019.

(Continued)

*Primary Examiner* — Jae Y Lee
*Assistant Examiner* — M Mostazir Rahman
(74) *Attorney, Agent, or Firm* — Slater Matsil, LLP (57) ABSTRACT

A communications network for communication between at least one power electronics element and at least one control unit is disclosed. At least one transmit/receive unit of the communications network is configured to receive at least one signal from an upstream direction, and evaluate if the at least one signal is correctly received. In case the at least one signal is correctly received, the at least one transmit/receive unit is configured to forward, in an allocated first time slot, the at least one signal to a plurality of transmit/receive units in a downstream direction, and receive, in an allocated second time slot, a plurality of signals from the plurality of transmit/receive units as a response of the forwarded at least one signal.

19 Claims, 3 Drawing Sheets (56) References Cited

U.S. PATENT DOCUMENTS

| | | |
|---|---|---|
| 2008/0178056 A1 | 7/2008 | Ackermann et al. |
| 2008/0212466 A1 | 9/2008 | Hsieh et al. |
| 2008/0247349 A1* | 10/2008 | Hsieh ............... H04L 1/189 |
| | | 370/315 |
| 2010/0195665 A1 | 8/2010 | Jackson |
| 2011/0038376 A1 | 2/2011 | Wiemann et al. |
| 2012/0033462 A1* | 2/2012 | Juhlin ................. H02J 3/36 |
| | | 363/35 |
| 2012/0144828 A1* | 6/2012 | Lazaris ............... H02J 3/382 |
| | | 60/641.1 |
| 2013/0139018 A1 | 5/2013 | Takada et al. |
| 2015/0063473 A1 | 3/2015 | Nishibayashi et al. |
| 2015/0071273 A1 | 3/2015 | Hencinski et al. |
| 2015/0085726 A1 | 3/2015 | Terai |
| 2017/0077751 A1 | 3/2017 | Forbes, Jr. |

FOREIGN PATENT DOCUMENTS

| | | |
|---|---|---|
| CN | 102449870 A | 5/2012 |
| CN | 103155492 A | 6/2013 |
| CN | 104247450 A | 12/2014 |
| EP | 2057775 B1 | 8/2012 |

OTHER PUBLICATIONS

International Search Report, issued in PCT/EP2017/061771, dated Feb. 14, 2018.
Written Opinion of the International Searching Authority, issued in PCT/EP2017/061771, dated Feb. 14, 2018.

* cited by examiner

COMMUNICATIONS NETWORK FOR COMMUNICATION BETWEEN A CONTROL UNIT AND A POWER ELECTRONICS ELEMENT

TECHNICAL FIELD

The present invention generally relates to the field of power systems, such as, for example, power transmission systems. Specifically, the present invention relates to a communications network for communication between at least one control unit and at least one power electronics element, wherein the at least one control unit is configured to control the at least one power electronics element.

BACKGROUND

PECs (power electronic systems), which for example may be included in converters, may be provided with communication means. Such communication means should preferably be robust and reliable and have a relatively low latency. Operation of PECs, such as, for example, IGBTs (insulated-gate bipolar transistors), may be controlled by means of a control unit by way of transmission of control signals, e.g., including switching commands or instructions, using multiple optical fiber (OF) communication links. However, OF links are relatively expensive to fabricate, install and/or maintain, and may also suffer from a relatively short life cycle and/or high rate of failure compared with PECs. Therefore, alternative solutions such as wireless power electronics have been proposed to replace the OF links.

As system reliability is of high importance, there is a wish to guarantee the integrity of control command transmissions. For example, a system may be configured to execute a command only in the case all of the provided PECs have correctly received the command. Moreover, if the command has to be carried by multiple wireless packets due to packet length limits, all necessary packets must be correctly received so that the command can be correctly represented. As a basic design principle, the control unit checks the success of control command transmission, and the PECs check the integrity of the received command. If the command integrity is false, the control unit may resend the previously sent command or send a new command, whereas the PECs should not execute the command and/or notify the control unit and other PECs. As the data traffic may be extremely intensive (e.g. Giga bit per second level throughput) and timing constraints may be extremely tight, a mechanism for integrity detection and failure notification may be required to occupy as less bandwidth (e.g. time slots) as possible without compromising the robustness of the system.

In the context of generic wireless communications, a typical process may be as follows: firstly, a command receiving unit may send an acknowledgement message (ACK) or non-acknowledgement message (NACK) to the command sending unit in order to notify whether the command has been correctly received or not. Secondly, the command sending unit may determine the integrity based on the individual ACKs or NACKs and notify the command-receiving unit accordingly. However, this process is relatively time consuming since the time for collecting ACKs or NACKs is normally N times longer than the time for sending the command itself (N being the number of receivers). It should be noted that for many systems, wherein N typically may be in the order of $10^3$ or $10^4$, this process is not even feasible when considering the relatively long process times.

Hence, there is a need of an efficient mechanism which is able to monitor the integrity during control command transmissions and which may notify failures whilst still minimizing the bandwidth.

SUMMARY

In view of the above, a concern of the present invention is to provide a communications network for communication between at least one control unit and at least one power electronics element, wherein the communications network is able to monitor the integrity during control command transmissions whilst still minimizing the bandwidth of the communication process.

This and other concerns are addressed by a communications network in accordance with the independent claim. Preferred embodiments are defined by the dependent claims.

According to a first aspect of the present invention, there is provided a communications network for communication between at least one control unit and a plurality of power electronics elements. The at least one control unit is configured to control the plurality of power electronics elements by means of transmitting at least one signal to the plurality of power electronics elements, wherein each power electronics element comprises a transmit/receive unit configured to transmit and/or receive the at least one signal. The communications network further comprises at least one array of at least one transmit/receive unit configured to, in an upstream direction from the plurality of power electronics elements to the at least one control unit and in a downstream direction from the at least control unit to the plurality of power electronics elements, receive at least one signal transmitted over the communications network in the downstream or upstream direction, and transmit the received at least one signal over the communications network in the downstream or upstream direction, respectively. The at least one transmit/receive unit is further configured to receive at least one signal from an upstream direction, and evaluate if the at least one signal is correctly received. In case the at least one signal is correctly received, the at least one transmit/receive unit is configured to forward, in an allocated first time slot, the at least one signal to a plurality of transmit/receive units in a downstream direction, and receive, in an allocated second time slot, a plurality of signals from the plurality of transmit/receive units in a downstream direction as a response of the forwarded at least one signal.

Thus, the present invention is based on the idea of providing a communications network wherein transmit/receive unit(s) may transmit one or more signals in a first time slot to a plurality of transmit/receive units in a downstream direction, and thereafter, to concurrently receive responses in a second time slot from the transmit/receive units to which the signal(s) were transmitted. These individual responses allow the transmit/receive unit(s) in the array(s) to evaluate which units (of the plurality of transmit/receive units) have successfully received the signal(s) and, respectively, which have not received the signal(s). As the communications network hereby is able to receive these responses concurrently rather than in sequence, the present invention is highly advantageous in that it is highly time-efficient with respect to the communication process time.

It will be appreciated that the present invention is advantageous in that it largely reduces the bandwidth associated with the handling of a correct, or erroneous, reception of signal(s) compared to systems in the prior art. For each allocated first time slot (in which the transmit/receive unit(s)

is (are) configured to forward the signal(s) to a plurality of transmit/receive units), the number of allocated second time slots (in which a plurality of signals from the plurality of transmit/receive units is received) equals the number of arrays arranged in series in the downstream/upstream direction, respectively. In other words, the number of allocated second time slots equals the number of array steps or hops. Whereas the number of allocated second time slots would be ≥5000 for communication networks for HVDC systems according to the prior art, the number of hops may be ≤3 for communication networks for HVDC systems according to the present invention, thereby leading to a significant time-efficiency for the communication process in the network. More specifically, the present invention may reduce the process time by a factor of thousand, or even more, compared to prior art systems.

The present invention is further advantageous in that the evaluation of a correct, or erroneous, reception of signal(s) enjoys a relatively high level of safety. For example, in case an acknowledgement notification and/or an error notification is lost, the communications network is configured to perform an error handling process.

In the context of one or more embodiments of the present invention, and for illustrating principles of the one or more embodiments of the present invention, the communications network can be described as a communications network having parts or portions thereof employing so called N-hop (multi-hop). By multi-hop communication—entailing, e.g., that there may be one or more arrays of intermediate transmit/receive units comprised in the communications network—the communications network may facilitate or allow for relatively long distances, e.g., up to a hundred meter or even more, between the at least one control unit and the at least one power electronics element, while still being capable of providing a high reliability, short latency, and/or a high data rate for the communications between the control unit(s) and the power electronics element(s).

As the communications network comprises at least one array of at least one transmit/receive unit, the term "array" may hereby be construed as a link, group, alignment, or the like, of intermediately arranged transmit/receive units in parallel. The transmit/receive units of the array may be configured to (at least almost) simultaneously receive/transmit signal(s) in the downstream or upstream direction of the communications network. Hence, the array(s) may constitute one or more intermediate transmit/receive units comprised in the communications network for communication of at least one signal over at least a part or portion of the communications network. The array(s) of the communications network may hereby comprise a plurality of links, and the one or more transmit/receive units of the array(s) may function as relays or repeaters in the communications network.

Furthermore, by the term "communication link", it may in the context of one or more embodiments of the present invention be meant a wireless communication link (e.g., a communication link over an air interface), or a wired communication link (e.g., comprising at least one optical waveguide), for communication of at least one signal over at least a part or portion of the communications network.

In the context of the present application, by wireless communication link it is meant in principle any type of communicative link, connection or coupling utilizing one or more wireless techniques or means for effecting communication, such, as for example, at least one radio frequency (RF) communication link, and/or an infrared communication link (e.g., a communication link employing infrared light) or another type of free-space optical communication link (e.g., based on laser). Further in the context of the present application, by wired communication link it is meant in principle any type of communicative link, connection or coupling utilizing one or more non-wireless techniques or means for effecting communication with broadcast characteristics, such, as for example, at least one optical waveguide, or optical transmission line (e.g., an optical fiber), and/or at least one electrical conductor (e.g., a cable or wire, e.g., a copper conductor or cable, or copper wire). Alternatively, "wired communication link" could be described as "non-wireless communication link", which hence may employ, for example, at least one optical waveguide, or optical transmission line, such as an optical fiber, and/or at least one cabling or wiring.

In the context of the present application, by a power electronics element it is meant in principle any element, module or unit including one or more power electronics components, for example comprising solid-state semiconductor devices or power semiconductor components such as IGBTs.

By the term "at least one signal", it is here meant substantially any signal or set of signals, which furthermore may be associated with a command, message, etc. For example, the at least one signal in the context of one or more embodiments of the present invention may constitute a command signal, an acknowledgement signal, an error notification signal, a message, or the like.

According to the first aspect of the present invention, the at least one transmit/receive unit of the array is configured to receive at least one signal from an upstream direction, and evaluate if the at least one signal is correctly received. Hence, the transmit/receive unit(s) evaluates (i.e. controls, checks) the signal correctness (integrity). In case the at least one signal is correctly received, the transmit/receive unit(s) may forward, in an allocated first time slot, the at least one signal to a plurality of transmit/receive units in a downstream direction. Hence, by the term "forward", it is hereby meant that the transmit/receive unit(s) are configured to transmit the same signal(s) as received in a downstream direction in the communications network. Furthermore, the at least one transmit/receive unit of the array is configured to receive, in an allocated second time slot, a plurality of signals from the plurality of transmit/receive units as a response of the forwarded at least one signal. By the term "response of the forwarded at least one signal", it may hereby be meant a response from a transmit/receive unit located downstream in the communications network to confirm a correctly received signal forwarded to that transmit/receive unit, or analogously, a response from a transmit/receive unit located downstream in the communications network to notify an erroneously received signal forwarded to that transmit/receive unit.

According to an embodiment of the present invention, each transmit/receive unit of the plurality of transmit/receive units is configured to evaluate if the at least one signal is correctly received. In case the at least one signal is correctly received, each transmit/receive unit is configured to transmit at least one signal to the at least one array of at least one transmit/receive unit, wherein the at least one signal is associated with an acknowledgement notification. Hence, in conjunction with the first aspect of the present invention, the at least one transmit/receive unit of the array is configured to concurrently receive, in an allocated second time slot, the acknowledgement notifications from the plurality of transmit/receive units.

By the term "acknowledgement notification", it is here meant substantially any (set of) signal(s), message(s), or the like, arranged to notify an acknowledgement. For example, the acknowledgement notification may constitute a so called "ACK" notification, which is known to the skilled person. The embodiment is advantageous in that all transmit/receive units may use the same acknowledgement methodology, leading to an even more time-efficient communications network.

According to an embodiment of the present invention, each transmit/receive unit of the plurality of transmit/receive units is configured to evaluate if the at least one signal is erroneously received. In case the at least one signal is erroneously received, each transmit/receive unit is configured to transmit at least one signal to the at least one array of at least one transmit/receive unit, wherein the at least one signal is associated with an error notification. By the term "error notification", it is here meant substantially any (set of) signal(s), message(s), or the like, arranged to notify an error associated with the reception of the signal(s). For example, the error notification may constitute a so called "NACK" notification, known to the skilled person. The embodiment is advantageous in that all transmit/receive units may use the same methodology related to the notification of errors, leading to an even more time-efficient communications network.

According to an embodiment of the present invention, each control unit comprises a transmit/receive unit configured to transmit and/or receive the at least one signal. It will be appreciated that the transmit/receive units of the control unit(s) may constitute or be communicatively integrated the array of transmit receive unit(s), wherein an arrangement of the communications network of this kind may be referred to as a "1-hop" (or single-hop) arrangement. Analogously, and according to another embodiment of the present invention, each power electronics element comprises a transmit/receive unit configured to transmit and/or receive the at least one signal. Hence, it may be entailed that the at least one intermediate transmit/receive unit is integrated with the control unit(s) or power electronics element(s), respectively, or that the at least one intermediate transmit/receive unit is directly connected/coupled to the control unit(s) or power electronics element(s). It will be appreciated that the embodiment(s) of the present invention may lead to an even faster and/or more reliable communication compared to an arrangement of the communications network wherein the control unit(s) and/or power electronics element(s) and the respective transmit/receive units are separately arranged.

According to an embodiment of the present invention, the at least one array of at least one transmit/receive unit is provided between the at least one control unit and the at least one power electronics element in the downstream and upstream direction, respectively. Hence, the array(s) of at least one transmit/receive unit may be arranged separately from the control unit(s) and power electronics element(s), wherein each of the intermediate transmit/receive units may be configured to receive at least one signal transmitted over the communications network in the direction from the at least one power electronics element to the at least one control unit, or vice versa, and transmit the received at least one signal over the communications network in the direction to the at least one control unit or the at least one power electronics element, respectively. As will be further described in the following with reference to the figures, the intermediate transmit/receive units of the array(s) may be arranged such that one of the intermediate transmit/receive units is configured to transmit/receive at least one signal transmitted/received by transmit/receive units of (another) array(s) arranged in the upstream or downstream direction of the communications network.

According to an embodiment of the present invention, the communications network comprises a single array of at least one transmit/receive unit. By the term "single array", it is hereby meant one, and only one, array or link of transmit/receive unit(s) arranged between the control unit(s) and the power electronics element(s) of the communications network. It will be appreciated that an arrangement of the communications network of this kind may be referred to as a "2-hop" arrangement.

According to an embodiment of the present invention, the communications network comprises a plurality of arrays of at least one transmit/receive unit, wherein each array of the plurality of arrays of at least one transmit/receive unit are arranged in series in the downstream and upstream direction, respectively. Any transmit/receive unit of a first array is configured to receive at least one signal transmitted over the communications network in the upstream direction from a transmit/receive unit of a second array provided downstream of the first array, and transmit at least one signal received over the communications network in the downstream direction to a transmit/receive unit of the second array. It will be appreciated that an arrangement of the communications network of this kind may be referred to as a N-hop or multi-hop arrangement. For example, if the communications network comprises two arrays of transmit/receive units arranged in series, the arrangement may be referred to as a "3-hop" arrangement. As previously mentioned, a provision of one or more arrays or links of transmit receive/units between the control unit(s) and power electronics element(s) may reduce the communication process time significantly compared to prior art systems. For example, the number of time slots intended for notification purposes would be ≥5000 for communication networks for HVDC systems according to the prior art, which may lead to very long process times. In the present invention, on the other hand, the number of allocated second time slots equals the number of array steps or hops. As the number of hops may be ≤3 for communication networks for HVDC systems, a significant time-efficiency for the communication process in the network may thereby be achieved by the present invention.

According to an embodiment of the present invention, at least one of the at least one transmit/receive unit is configured to receive and transmit, respectively, at least one signal over a wireless communication link. It will be appreciated that modules, or building blocks or cells, of converters may be on relatively high electric potential with respect to ground potential, for example 1 kV or more, possibly up to 30 kV or even more. By at least one communication link at least in part utilizing a wireless communication link, galvanic separation between the at least one power electronics element (e.g., comprising or being constituted by one or more converter modules) and other components, such as, for example, the at least one control unit and/or the at least one intermediate transmit/receive unit, may be facilitated or allowed. The wireless communication link may comprise at least one radio frequency communication link, an infrared communication link or a free-space optical communication link.

According to an embodiment of the present invention, at least one of the at least one transmit/receive unit is configured to receive and transmit, respectively, at least one signal over a wired communication link. The wired communication link may comprise at least one of: at least one optical waveguide or at least one electrical conductor.

According to an embodiment of the present invention, the communications network is configured to permit communication between the at least one control unit and the at least one power electronics element based on TDMA (Time-Division Multiple Access), SDMA (Space-Division Multiple Access), FDMA (Frequency-Division Multiple Access) (e.g., OFDMA (Orthogonal Frequency-Division Multiple Access) or COFDMA (Coded Orthogonal Frequency-Division Multiple Access)) or CDMA (Code Division Multiple Access), or any combination thereof.

According to a second aspect of the present invention, there is provided a control unit configured to be used in conjunction with a communications network according to any one of the preceding embodiments. The control unit is configured to control at least one power electronics element by means of transmitting at least one control signal to the at least one power electronics element via the communications network.

According to a third aspect of the present invention, there is provided a power electronics element configured to be used in conjunction with a communications network according to any one of the preceding embodiments. The power electronics element is configured to receive at least one control signal transmitted by a control unit via the communications network.

According to a fourth aspect of the present invention, there is provided a system comprising at least one power electronics element, at least one control unit, and a communications network according to at least one of the previous embodiments for communication between the at least one power electronics element and the at least one control unit.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments are provided by way of example so that this disclosure will convey the scope of the present invention to those skilled in the art.

Figure 1:
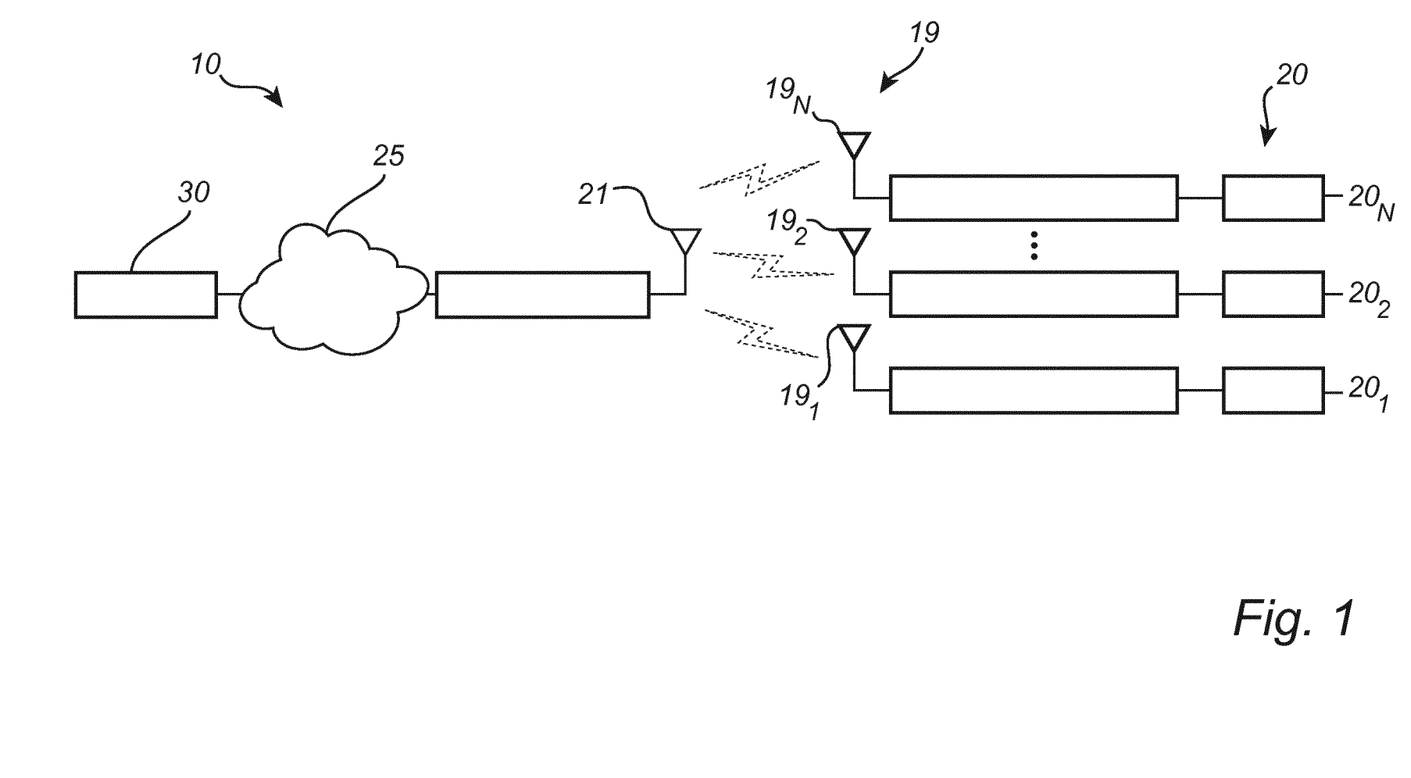
FIGS. 1-3 are schematic views of communications networks according to embodiments of the present invention.

FIG. 1 is a schematic view of a communications network, or communications system, 10 according to an embodiment of the present invention. The communication network 10 is for communication between power electronics elements 20 and a control unit 30, which may be separately arranged.

The control unit 30, which is connected to a network 25, is configured to control the power electronics elements 20 by means of transmitting at least one signal, e.g. in the form of a control signal, to the power electronics elements 20. As exemplified, the power electronics elements 20 comprises power electronic components $20.\text{sub}.1, 20.\text{sub}.22, \ldots, 20.\text{sub}.NN$, wherein N may be, substantially, any integer. The power electronics elements 20 are coupled to a respective transmit/receive unit 19. Hence, the power electronic components $20.\text{sub}.1, 20.\text{sub}.2, \ldots, 20.\text{sub}.N$ are coupled to transmit/receive units $19.\text{sub}.1, 19.\text{sub}.2, \ldots, 19.\text{sub}.N$, respectively, which are configured to transmit and/or receive at least one signal. For example, the transmit/receive units $19.\text{sub}.1, 19.\text{sub}.2, \ldots, 19.\text{sub}.N$ may each include a wireless transceiver having an antenna (e.g., an RF antenna).

The control unit 30 is coupled to a transmit/receive unit 21 via the network 25. It will be appreciated that the connection between the control unit 30 and the network 25 and/or between the network 25 and the transmit/receive unit 21 may comprise a wired and/or wireless connection, an optical waveguide, such as, for example, at least one optical fiber, or a combination thereof. The arrangement of the communications network 10 as exemplified may be referred to as 1-hop.

The power electronics elements 20 may for example be comprised in a converter configured to convert high voltage DC to AC, or vice versa. The converter may for example comprise a plurality of cells (not shown in FIG. 1). The converter may for example comprise or be constituted by a HVDC converter. The control unit 30 may be configured to control at least one of the plurality of cells of the converter by means of transmitting at least one control signal to the at least one of the plurality of cells.

It will be appreciated that the control unit 30 may be configured to control each power electronics element $20_1, 20_2, \ldots, 20_N$ independently of the other ones. It is further to be understood that the communications network 10 may comprise several control units 30.

In this exemplifying embodiment of the present invention, and in the context of the present invention, the transmit/receive unit 21 corresponds to an array or link of at least one transmit/receive unit, albeit the transmit/receive unit 21 hereby corresponds to a one-unit array. In an upstream direction from the plurality of power electronics elements 20 to the control unit 30 and in a downstream direction from the control unit 30 to the plurality of power electronics elements 20, the transmit/receive unit 21 is configured to receive at least one signal transmitted over the communications network 10 in the downstream or upstream direction. Analogously, the transmit/receive unit 21 is configured to transmit the received at least one signal over the communications network 10 in the downstream or upstream direction, respectively.

Figure 2:
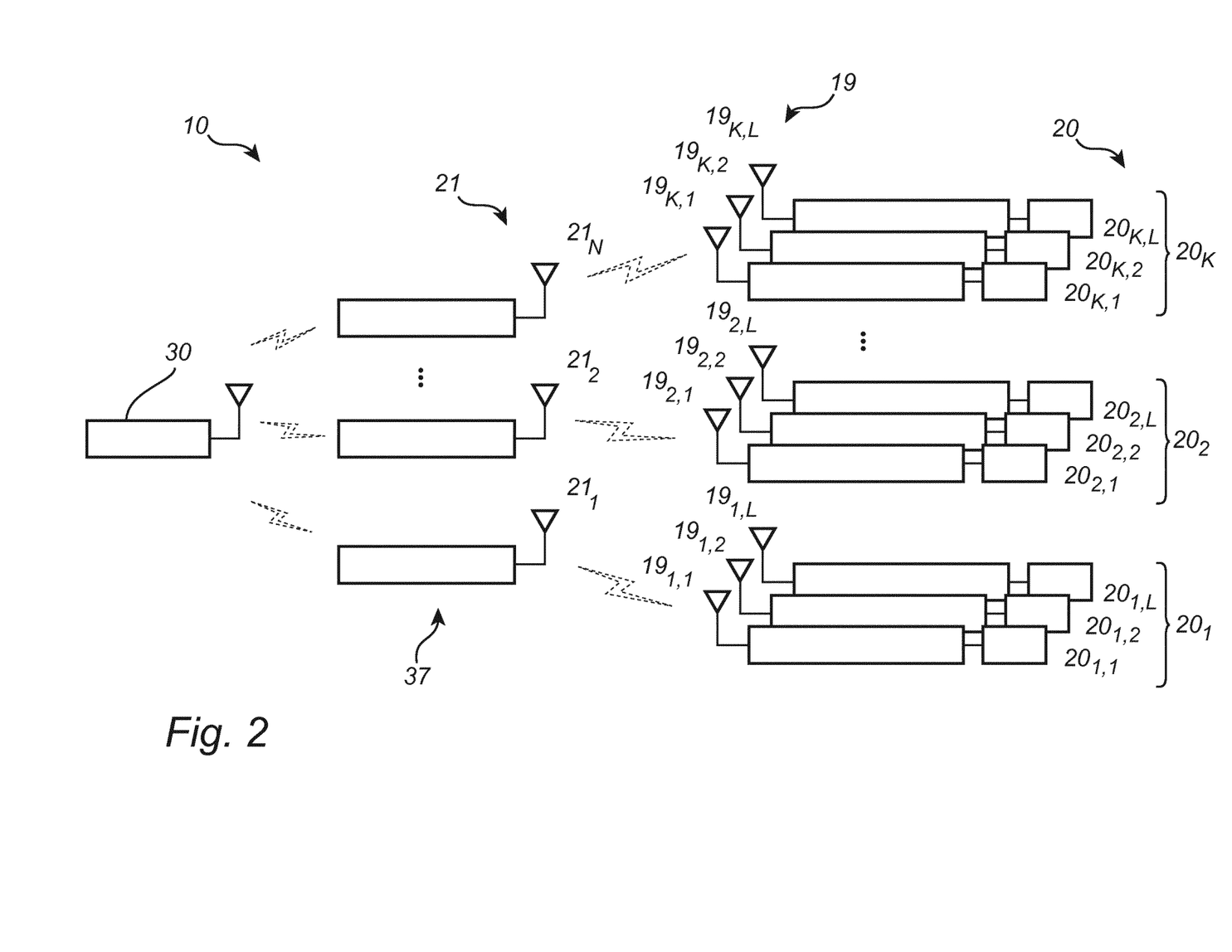

FIG. 2 is a schematic view of a communications network, or communications system, 10 according to an embodiment of the present invention, and presented as an alternative to the communications network 10 of FIG. 1. Hence, it is referred to FIG. 1 for several features and/or functions of the communications network 10 in FIG. 2.

Analogously with the communications network 10 of FIG. 1, the control unit 30 is configured to control the power electronics elements 20. As exemplified, the power electronics elements 20 are arranged in groups $20_1, 20_2, \ldots, 20_K$, wherein each of the K groups $20_1, 20_2, \ldots, 20_K$ comprises L power electronics elements. It will be appreciated that the integers L and K may be substantially any integers.

The power electronics elements 20 are controlled by the control unit 30 by means of transmitting at least one signal, e.g. in the form of a control signal, to the power electronics elements 20. Here, each power electronics elements $20_{1,1}$, $20_{1,2}, \ldots, 20_{K,L}$ of the groups $20_1, 20_2, \ldots, 20_K$ of power electronics elements 20 comprises a transmit/receive unit $19_{1,1}, 19_{1,2}, \ldots, 19_{K,L}$, respectively, configured to transmit and/or receive at least one signal.

In this exemplifying embodiment of the present invention, the communications network 10 comprises a (single) array 37 of transmit/receive units 21. In FIG. 2, the array 37 comprises transmit/receive units $21_1, 21_2, \ldots, 21_N$, and as N may be substantially any integer, the array 37 may comprise substantially any number of transmit/receive units 21. In an upstream direction from the plurality of power electronics elements 20 to the control unit 30 and in a downstream direction from the control unit 30 to the plurality of power electronics elements 20, the transmit/receive units 21 of the array 37 are configured to receive at least one signal transmitted over the communications network 10 in the downstream or upstream direction. Analogously, the transmit/receive units 21 of the array 37 are configured to transmit the received at least one signal over the communications network 10 in the downstream or upstream direction, respectively.

The arrangement of the communications network 10 as exemplified may be referred to as 2-hop, wherein the first hop is provided between the control unit 30 and the array 37, and the second hop is provided between the array 37 and the plurality of power electronics elements 20. However, it will be appreciated that there may be provided communications networks comprising two, or even more, arrays arranged serially in an upstream/downstream direction. For example, a communications networks comprising N–1 arrays of transmit/receive units (e.g. two arrays) may be referred to as N-hop (e.g. 3-hop).

It will be appreciated that the connection between the control unit 30 and the network 25 and/or between the network 25 and the transmit/receive units 21 may comprise a wired and/or wireless connection, an optical waveguide, such as, for example, at least one optical fiber, or a combination thereof.

As indicated in the foregoing, a wireless communication link between the control unit 30 and the array 37 may in principle comprise or be constituted by any type of communicative link, connection or coupling utilizing one or more wireless techniques or means for effecting communication, such, as for example, at least one RF communication link, an infrared communication link or another type of free-space optical communication link.

Figure 3:
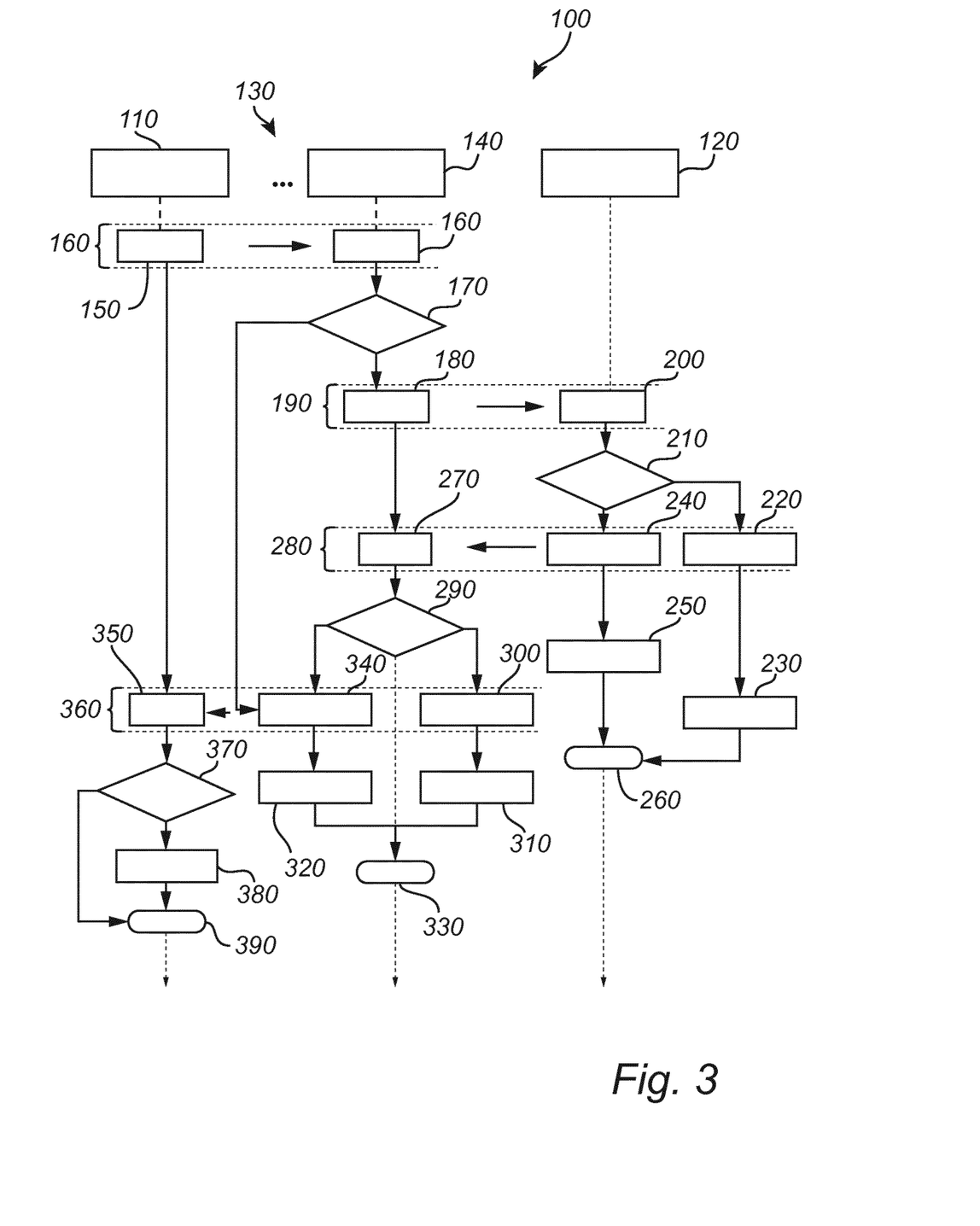

FIG. 3 is a schematic view of a flow chart 100 of a communications network, or communications system, according to an embodiment of the present invention. The communications network is provided for a communication between a control unit 110 and a plurality of power electronics elements (not shown) coupled to a plurality of transmit/receive units 120 (for simplicity, only one transmit/receive unit 120 is schematically indicated in FIG. 3). The communications network comprises an array 130 of at least one transmit/receive unit 140 arranged between the control unit 110 and the plurality of transmit/receive units 120 (for simplicity, only one transmit/receive unit 140 of the array 130 is schematically indicated in FIG. 3). It will be appreciated that the exemplifying communications network 10 in FIG. 3 may be referred to as a "2-hop" arrangement, as the (single) array 130 of transmit/receive units 140 is provided as a link between the control unit 110 and the transmit/receive units 120 of the at least one power electronics element in the downstream and upstream direction, respectively, or the communications network. Although FIG. 3 only discloses the arrangement of a single array 130 of transmit/receive units 140, there may be provided a plurality of arrays arranged in series, leading to a N-hop arrangement. In the latter case, the transmit/receive units of the array(s) may be configured to transmit/receive at least one signal transmitted/received by transmit/receive units of (another) array(s) arranged in the upstream or downstream direction of the communications network 10.

The array 130 of at least one transmit/receive unit 140 is arranged separately from the control unit(s) 110 and power electronics element(s). Each of the intermediate transmit/receive units 140 may be configured to receive at least one signal transmitted over the communications network 10 in the direction from the at least one power electronics element to the one control unit 110, or vice versa, and transmit the received at least one signal over the communications network in the direction to the control unit 110 or the at least one power electronics element, respectively.

In FIG. 3, the control unit 110 of the communications network is configured to (e.g. via one or more transmit/receive units not shown) send 150 at least one signal, e.g. in the form of a command signal, in an allocated time slot 160, to a transmit/receive unit 140 of the array 130 in a downstream direction. The transmit/receive unit 140 is configured to receive 160 this command signal, in an allocated time slot, from the upstream direction. The transmit/receive unit 140 is configured to evaluate 170 if the command signal is correctly received. If the command signal is correctly received, the transmit/revive unit 140 is configured to forward 180, in an allocated first time slot 190, the command signal to the plurality of transmit/receive units 120 in the downstream direction of the communications network 10. Each transmit/receive unit 120 is configured to receive 200 the (forwarded) command signal in an allocated time slot, and to evaluate 210 if the command signal is correctly received. If the command signal is correctly received, each transmit/receive unit 120 is configured to transmit 220 at least one signal to the transmit/receive unit 140 of the array 130, wherein the at least one signal is associated with an acknowledgement notification (e.g. a so called "ACK" notification). The transmit/receive unit 120 is further configured to send the command signal to the power electronics elements, such that the power electronics elements may execute 230 the command associated with the correctly received command signal. Analogously, each transmit/receive unit 120 is configured to evaluate 210 if the command signal is erroneously received. If the command signal is erroneously received, the transmit/receive unit 120 is configured to transmit 240 at least one signal to the transmit/receive unit 140, wherein the at least one signal is associated with an error notification (e.g. a so called "NACK" notification). Furthermore, in the case of an erroneous reception of the command signal, the transmit/receive unit 120 is configured to perform an error handling process 250. It will be appreciated that the error handling process can be simply resending the same command until timeout, or switch the system into safe mode, or other operations. Whether the power electronics element has executed 230 the command or an error handling process 250 has been performed, the communications network 10 may continue 260 in an iterative manner with the communication process.

If the communications network 10 has determined 210 that the command signal has been correctly received by the transmit/receive unit 120, the transmit/receive unit 140 of the array 130 is configured to concurrently receive 270 the acknowledgement notification(s) or the error notification(s) from all transmit/receive units 120 in the same allocated second time slot 280 as a response of the forwarded command signal. It will be appreciated that the error notification(s) and/or acknowledgement notification(s) from multiple transmit/receive units 120 may be sent concurrently through CDMA (code division multiple access), or FDMA (frequency division multiple access), or OFDMA (orthogonal frequency division multiple access), or TSC-OFDMA (time special coded orthogonal frequency division multiple access), or other multiple access schemes allowing concurrent transmission. It will be appreciated that the allocated second time slot may also be denoted concurrent acknowledgement (C-ACK) slot.

The evaluation (detection) 290 of the acknowledgement notification or error notification by the transmit/receive unit 140 of the array 130 can be realized by the transmit/receive unit 140 receiving and decoding the signals in parallel but separately from each transmit/receive unit 120. If the transmit/receive unit 140 does not detect any error in the received notification, the transmit/receive unit 140 is configured to transmit 300 at least one signal to the control unit 110, wherein the at least one signal is associated with an acknowledgement notification (e.g. a so called "ACK" notification). Furthermore, it is configured to execute 310 the command associated with the command signal. In contrast, if the transmit/receive unit 140 detects any error in the received notification, it is configured to perform 320 an error handling process. Whether the transmit/receive unit 140 has allowed for an execution 310 the command or performed an error handling process 320, the communications network 10 may continue 260 in an iterative manner with the communication process.

If the transmit/receive unit 140 detects an error related to the command signal reception, the transmit/receive unit 140 is configured to transmit 340 at least one signal to the control unit 110, wherein the at least one signal is associated with an error notification (e.g. a so called "NACK" notification). Hence, the control unit 110 is configured to concurrently receive 350 the acknowledgement notification(s) or the error notification(s) from all transmit/receive units 140 of the array 130 in the same allocated time slot 360, i.e. a concurrent acknowledgement (C-ACK) slot. If the control unit 110 detects 370 any error in the received notification, it is configured to perform 380 an error handling process. If the control unit 110 does not detect any error in the received notification, the communication process is configured to continue 390.

With reference to all of the illustrated embodiments, the antenna(s) of the wireless transceiver(s) of any one of the illustrated elements of the depicted communication networks may for example comprise an RF antenna or an infrared antenna. The antenna(s) may comprise at least one directional and/or polarized antenna, e.g., an RF antenna. By means of a directional and/or polarized antenna, the propagation of at least one signal over the communications network may be facilitated, and interference may be reduced or even minimized.

In conclusion a communications network for communication between at least one control unit and at least one power electronics element is disclosed. According to one or more embodiments of the present invention, the communications network can be described as a communications network wherein transmit/receive unit(s) may transmit one or more signals in a first time slot to a plurality of transmit/receive units in a downstream direction, and thereafter, to concurrently receive responses in a second time slot from the transmit/receive units to which the signal(s) were transmitted.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A communications network in a High Voltage Direct Current, HVDC, power system for communication between at least one controller and a plurality of power electronics elements comprised in the HVDC power system, wherein the at least one controller is configured to control the plurality of power electronics elements by means of transmitting at least one signal to the plurality of power electronics elements, wherein the communications network further comprises:
 a plurality of arrays of at least one first transmitter/receiver, wherein each array of the plurality of arrays of at least one first transmitter/receiver is arranged in series in a downstream direction and an upstream direction, respectively, such that any first transmitter/receiver of a first array is configured to receive at least one signal transmitted over the communications network in the upstream direction from a third transmitter/receiver of a second array provided downstream of the first array, and transmit at least one signal received over the communications network in the downstream direction to a third transmitter/receiver of the second array, wherein at least one array of the at least one first transmitter/receiver is configured to, in an upstream direction from the plurality of power electronics elements to the at least one controller and in a downstream direction from the at least one controller to the plurality of power electronics elements, receive at least one signal transmitted over the communications network in the downstream direction or upstream direction, and transmit the received at least one signal over the communications network in the downstream or upstream direction, respectively, wherein the at least one first transmitter/receiver is further configured to:
 receive at least one signal from an upstream direction, and evaluate if the at least one signal is correctly received, and
 in case the at least one signal is correctly received, forward, in an allocated first time slot, the at least one signal to a plurality of second transmitters/receivers in a downstream direction, and receive, in an allocated second time slot, a plurality of signals from the plurality of second transmitters/receivers as a response of the forwarded at least one signal.

2. The communications network according to claim 1, wherein each transmitter/receiver in the plurality of second transmitters/receivers is configured to:
  evaluate if the at least one signal is correctly received, and
  in case the at least one signal is correctly received, transmit at least one signal to the at least one array of at least one first transmitter/receiver, wherein the at least one signal is associated with an acknowledgement notification.

3. The communications network according to claim 2, wherein each transmitter/receiver of the plurality of second transmitters/receivers is configured to:
  evaluate if the at least one signal is erroneously received, and
  in case the at least one signal is erroneously received, transmit at least one signal to the at least one array of at least one first transmitter/receiver, wherein the at least one signal is associated with an error notification.

4. The communications network according to claim 2, wherein each controller comprises a first transmitter/receiver configured to transmit the at least one signal, receive the at least one signal, or a combination thereof.

5. The communications network according to claim 2, wherein each power electronics element comprises a second transmitter/receiver configured to transmit the at least one signal, receive the at least one signal, or transmit and receive the at least one signal.

6. The communications network according to claim 1, wherein each transmitter/receiver in the plurality of second transmitters/receivers is configured to:
  evaluate if the at least one signal is erroneously received, and
  in case the at least one signal is erroneously received, transmit at least one signal to the at least one array of at least one first transmitter/receiver, wherein the at least one signal is associated with an error notification.

7. The communications network according to claim 6, wherein each controller comprises a first transmitter/receiver configured to transmit the at least one signal, receive the at least one signal, or a combination thereof.

8. The communications network according to claim 1, wherein each controller comprises a first transmitter/receiver configured to transmit the at least one signal, receive the at least one signal, or a combination thereof.

9. The communications network according to claim 1, wherein each power electronics element comprises a second transmitter/receiver configured to transmit the at least one signal, receive the at least one signal, or a combination thereof.

10. The communications network according to claim 1, wherein the at least one array of at least one first transmitter/receiver is provided between the at least one controller and the at least one power electronics element in the downstream and upstream direction, respectively.

11. The communications network according to claim 10, comprising a single array of at least one first transmitter/receiver.

12. The communications network according to claim 1, wherein the at least one of the at least one first transmitter/receiver is configured to transmit and receive at least one signal over a wireless communication link.

13. The communications network according to claim 12, wherein the wireless communication link comprises at least one radio frequency communication link, an infrared communication link, a free-space optical communication link, or a combination thereof.

14. The communications network according to claim 1, wherein the at least one of the at least one first transmitter/receiver is configured to transmit and receive at least one signal over a wired communication link.

15. The communications network according to claim 14, wherein the wired communication link comprises an optical waveguide, an electrical conductor, or a combination thereof.

16. The communications network according to claim 1, wherein the communications network is configured to permit communication between the at least one controller and the at least one power electronics element based on TDMA, SDMA, FDMA, CDMA, or any combination thereof.

17. A controller configured to be used in conjunction with a communications network in a High Voltage Direct Current (HVDC) power system and to control at least one power electronics element by means of transmitting at least one control signal to the at least one power electronics element via the communications network, wherein the controller is configured to control a plurality of power electronics elements by means of transmitting at least one signal to the plurality of power electronics elements, wherein the communications network further comprises:
  a plurality of arrays of at least one first transmitter/receiver, wherein each array of the plurality of arrays of at least one first transmitter/receiver is arranged in series in a downstream direction and an upstream direction, respectively, such that any first transmitter/receiver of a first array is configured to receive at least one signal transmitted over the communications network in the upstream direction from a third transmitter/receiver of a second array provided downstream of the first array, and transmit at least one signal received over the communications network in the downstream direction to a third transmitter/receiver of the second array, wherein at least one array of the at least one first transmitter/receiver is configured to, in an upstream direction from the plurality of power electronics elements to the controller and in a downstream direction from the controller to the plurality of power electronics elements, receive at least one signal transmitted over the communications network in the downstream direction or upstream direction, and transmit the received at least one signal over the communications network in the downstream or upstream direction, respectively, wherein the at least one first transmitter/receiver is further configured to:
  receive at least one signal from an upstream direction, and evaluate if the at least one signal is correctly received, and
  in case the at least one signal is correctly received, forward, in an allocated first time slot, the at least one signal to a plurality of second transmitters/receivers in a downstream direction, and receive, in an allocated second time slot, a plurality of signals from the plurality of second transmitters/receivers as a response of the forwarded at least one signal.

18. A power electronics element configured to be used in conjunction with the communications network according to claim 1 and to receive at least one control signal transmitted by a controller to the power electronics element via the communications network.

19. A system comprising:
  at least one power electronics element;
  at least one controller; and
  a communications network in a High Voltage Direct Current (HVDC) power system for communication between the at least one controller and a plurality of power electronics elements comprised in the HVDC power system, wherein the at least one controller is configured to control the plurality of power electronics elements by means of transmitting at least one signal to the plurality of power electronics elements, wherein the communications network further comprises:

a plurality of arrays of at least one first transmitter/receiver, wherein each array of the plurality of arrays of at least one first transmitter/receiver is arranged in series in a downstream direction and an upstream direction, respectively, such that any first transmitter/receiver of a first array is configured to receive at least one signal transmitted over the communications network in the upstream direction from a third transmitter/receiver of a second array provided downstream of the first array, and transmit at least one signal received over the communications network in the downstream direction to a third transmitter/receiver of the second array, wherein at least one array of the at least one first transmitter/receiver is configured to, in an upstream direction from the plurality of power electronics elements to the at least one controller and in a downstream direction from the at least one controller to the plurality of power electronics elements, receive at least one signal transmitted over the communications network in the downstream direction or upstream direction, and transmit the received at least one signal over the communications network in the downstream or upstream direction, respectively, wherein the at least one first transmitter/receiver is further configured to:

receive at least one signal from an upstream direction, and evaluate if the at least one signal is correctly received, and in case the at least one signal is correctly received, forward, in an allocated first time slot, the at least one signal to a plurality of second transmitters/receivers in a downstream direction, and receive, in an allocated second time slot, a plurality of signals from the plurality of second transmitters/receivers as a response of the forwarded at least one signal.

* * * * *